July 8, 1958     J. L. MARTIN     2,842,735
APPARATUS FOR ELECTRICAL LOGGING
Filed Sept. 12, 1955     4 Sheets-Sheet 1

INVENTOR.
John L. Martin

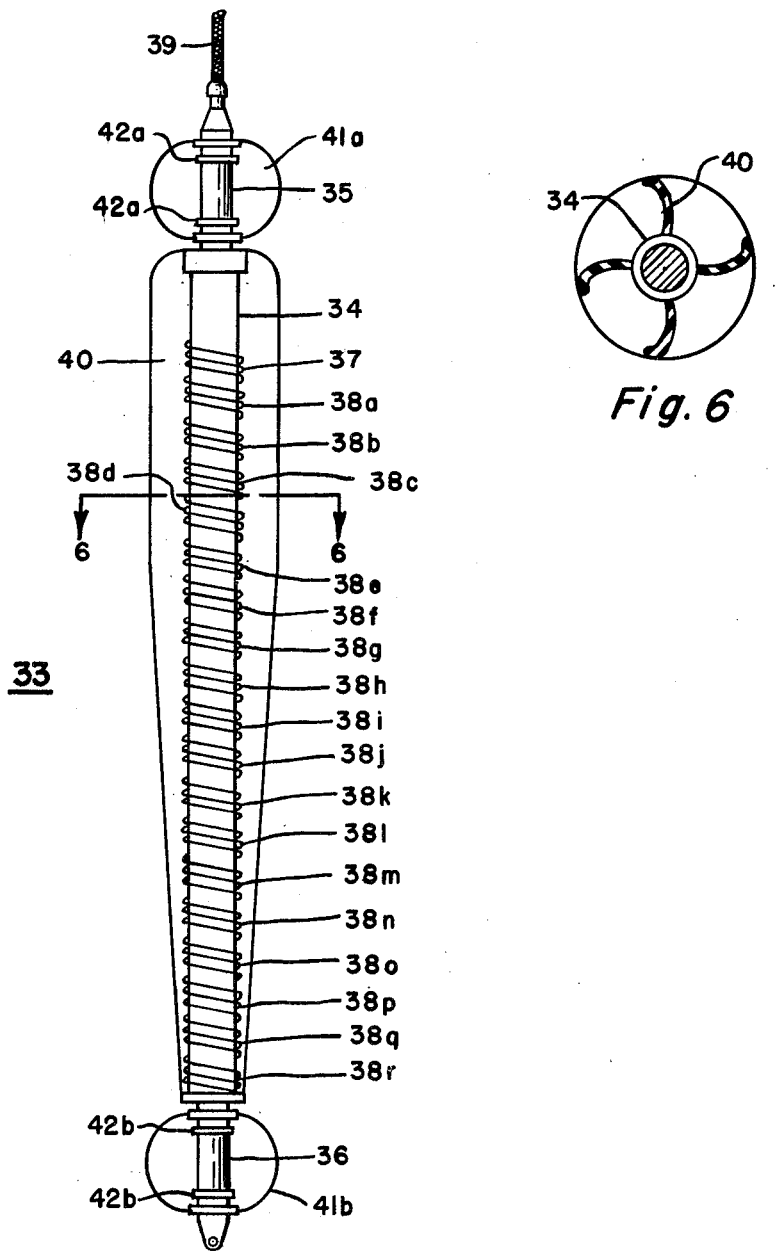

July 8, 1958     J. L. MARTIN     2,842,735
APPARATUS FOR ELECTRICAL LOGGING
Filed Sept. 12, 1955     4 Sheets-Sheet 4

ATTEST
Charles F. Steininger

INVENTOR.
John L. Martin
BY Norbert E. Birch
ATTORNEY

United States Patent Office 2,842,735
Patented July 8, 1958

2,842,735
APPARATUS FOR ELECTRICAL LOGGING

John L. Martin, Irving, Tex., assignor to The Atlantic Refining Company, Philadelphia, Pa., a corporation of Pennsylvania Application September 12, 1955, Serial No. 533,659

10 Claims. (Cl. 324—1)

The present invention relates to apparati for electrically logging earth formations traversed by a well bore. In a more specific aspect the present invention relates to apparati for electrically logging earth formations traversed by a well bore whereby the existence of displaceable hydrocarbons in such formations can be detected.

In the past many methods and apparati have been developed for locating and mapping the boundaries of oil-or-gas-bearing earth formations traversed by a well bore. Among the most successful of these methods has been the electrical log. By the measurement of various electrical properties of earth formations and the fluids contained therein, it is known for example, that the upper and lower limits of probable fluid-bearing formations can be located and that the nature of such fluids, whether hydrocarbons or water, can be determined with reasonable accuracy. The latter determination is generally made by establishing an electrical field in the formations surrounding the well bore and then measuring the electrical resistivity of such formations. Based on the premise that hydrocarbon-bearing formations exhibit higher resistivities than the same formation substantially filled with water, the nature of the fluids present in a particular formation can be qualitatively determined from these resistivity measurements. In addition, it is also known that certain mathematical operations may be performed on these resistivity measurements in order to obtain a quantitative indication of the relative amounts of hydrocarbons and water present in the most promising formations. However, in order to make such quantitative determinations it is necessary to know the true resistivity of the formation, the connate water resistivity, the formation factor and the saturation exponent. In some cases all of these values are not available and in still other cases the values obtained are open to question. Thus, it is an extremely cumbersome task to obtain relative saturation information and there is always the question of whether such information is accurate. In addition, the fact that a particular formation is designated as hydrocarbon-bearing does not necessarily answer the further question of whether the hydrocarbons present can be produced from the formation by known recovery methods. Further, there is the ever present possibility that formations containing hydrocarbons will be overlooked and bypassed due to poor shows on these prior art electrical logs even though these formations contain quantities of hydrocarbons which can be economically produced. Thus, it is obvious that a rapid and economical method of determining whether recoverable or displaceable hydrocarbons are present in subsurface earth formations would be extremely helpful in the location and recovery of hydrocarbons.

Co-pending application, Serial No. 317,102, filed October 27, 1952, by Ellis W. Shuler, Jr., Henry F. Dunlap, and Lloyd E. Gourley, Jr., entitled "Method and Apparatus for Locating Displaceable Oil in Subterranean Formations," now Patent No. 2,782,364, describes and claims a novel method for solving this vexing problem of locating recoverable hydrocarbons. In accordance with the application referred to above, it has been discovered that three distinct zones, radially displaced from a well bore and having distinctive resistivities, are formed in a formation containing displaceable hydrocarbons when the well bore is drilled with a drilling fluid having a resistivity higher than the resistivity of the connate water present in the formation. These three zones consist essentially of an annular section immediately surrounding the well bore which contains drilling fluid filtrate and has a comparatively high resistivity, a second annular section surrounding the first section which contains connate water forced back into the formation by the invading filtrate and has a comparatively low resistivity and a third zone which corresponds essentially to the virgin formation containing substantial amounts of hydrocarbons and has a comparatively high resistivity. Thus, in accordance with this method a well bore is drilled with a drilling fluid having a resistivity higher than the resistivity of the connate water of the formation of interest and measurements of resistivity are made in at least three zones radically displaced from the borehole. If the formation being investigated contains displaceable hydrocarbons this phenomenon will be indicated by the measurement of a low resistivity between two zones having relatively high resistivities.

The method described above may be carried out by various forms of apparati. However, one form of apparatus found to be highly successful in the detection of displaceable hydrocarbons in subsurface earth formations is described and claimed in co-pending application, Serial No. 418,588, by Henry F. Dunlap and Leonidas P. Whorton, entitled "Electrical Well Logging Instrument." This instrument comprises an elongated non-conductive body adapted to be lowered into a well bore and carrying at least one means for establishing an electrical field in the formations surrounding the well bore and at least three pick-up elements adapted to measure the magnitude of electrical energy which has traversed three distinct radial zones of the earth formation. Due to the close proximity of at least one of the pick-up elements to the means for establishing the electrical field it was found necessary to provide means for blocking the flow of current through the fluid present in the well bore. One such blocking means consists essentially of a plurality of non-conductive elements attached to the body member and extending radially to the wall of the well bore in a manner such that the flow of current in the well bore is essentially prevented. It has been found, however, that false resistivity measurements are sometimes obtained near the end of a tool of this nature due to an abrupt change from full diameter current-blocking elements to no current-blocking elements. In addition, although this tool can be safely run in the well bore when a comparatively small number of pick-up elements and current-blocking elements are distributed along a tool measuring no more than a few feet in length, it has been found to have certain limitations in cases where a large number of pick-up elements and current-blocking elements are distributed along a comparatively long tool. For example, in the detection of displaceable hydrocarbons it has been found that often as many as 18 or more pick-up elements distributed over a tool measuring 72 inches or more in length must be employed in order to provide reliable results. It has been found, however, that a tool of such proportions having current-blocking elements substantially equal to the diameter of the well bore extending the entire length of the tool cannot be safely lowered into and withdrawn from a well bore. Such a tool sticks in the well bore and the current-blocking elements are often damaged. This difficulty obviously results in poor records or no record at all and a considerable loss of time.

It is therefore an object of the present invention to provide an improved electrical logging tool.

A further object of the present invention is to provide an improved electrical logging tool having at least one transmitting element and at least three pick-up elements, at least one of which is close to the transmitting element and another of which is a considerable distance from the transmitting element.

Still another object of the present invention is to provide an improved electrical logging tool wherein at least one transmitting element and at least three pick-up elements are spaced a considerable distance along the body of the tool and current-blocking means essentially prevent the flow of current in the well bore.

These and other objects will be apparent from the following detailed description read in conjunction with the drawings wherein:

Figure 1 diagrammatically shows the three zones surrounding a well bore which are of interest in the detection of displaceable hydrocarbons in earth formations.

Figure 5 is a diagrammatic representation of a second modification of the logging tool of the instant invention in detail.

Figure 6 is a cross-section of the tool of Figure 5.

In accordance with the present invention it has been found that current flow in a well bore when using an electrical logging tool having at least one transmitting element and at least three pick-up elements, one of which is spaced close to the transmitting element and another of which is spaced a considerable distance from the transmitting element, can be effectively reduced and sticking of the tool during running can be eliminated by providing current-blocking means which exhibit a maximum current-impeding effect for a predetermined distance from the transmitting element. However, it has also been found that an abrupt change from current-blocking means which exhibit a maximum effect to no current-blocking means results in a distorted current flow pattern in the formations surrounding the well bore and consequently false indications of the electrical parameters being measured. This phenomenon is most pronounced in a tool having pick-up elements located beyond the current-blocking means, but is also present when current-blocking means exhibiting a maximum effect extend to a point close to or just beyond the most remote pick-up element. It has also been found in accordance with the instant invention that this difficulty can be overcome by providing additional current-blocking means of gradually diminishing current-impeding effect as the end of the tool is approached and preferably of gradually diminishing effect as the pick-up element most remote from the transmitting element is approached.

Figures 1, 2, 4:
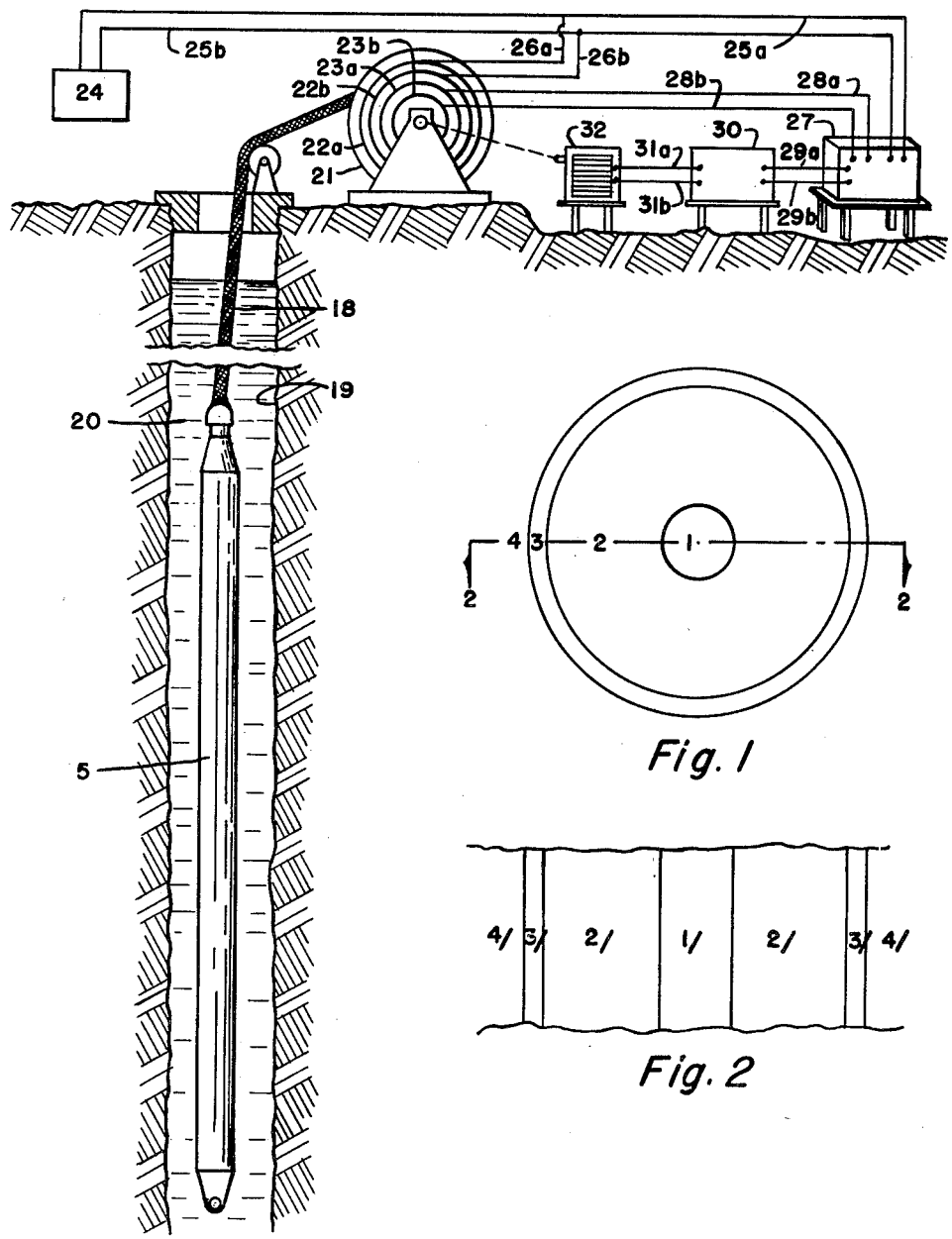
Figure 2 shows a cross-section of Figure 1.
Figure 4 is a diagrammatic representation of a typical recording system for the tool of Figure 3.

Referring now to Figure 1, three distinct zones existing in a formation containing displaceable hydrocarbons which has been traversed by a well bore 1 are shown. As is disclosed in co-pending application, Serial No. 317,102, referred to above, when a well bore 1 is drilled by the rotary method, filtrate from the drilling fluid employed during drilling invades the formation immediately adjacent the well bore. The invading drilling fluid filtrate displaces the original fluids present in the formation to form a filtrate-invading zone 2, substantially free of original formation fluids, immediately adjacent the well bore. The original formation fluids consisting essentially of water and hydrocarbons are thus forced back into the formation. However, it has been found in accordance with the application referred to that these formation fluids are not displaced with equal facility and as a result the water, commonly referred to as "connate water," forms a bank of connate water, designated as zone 3, immediately adjacent the filtrate-invaded zone 2 and the hydrocarbons are forced still further back into the virgin formation referred to as zone 4. Thus, when a well bore is drilled with a drilling fluid having a resistivity higher than the resistivity of connate water, a filtrate-invaded zone 2 having a relatively high resistivity is formed immediately adjacent the well bore, a connate water zone 3 having a relatively low resistivity is formed beyond filtrate-invaded zone 2, and a hydrocarbon zone 4 having a relatively high resistivity substantially equal to the resistivity of the virgin formation extends beyond connant water zone 3.

As pointed out previously, the existance of a low resistivity zone of connate water, hereinafter referred to as the "low zone," between a high resistivity filtrate-invaded zone and a high resistivity hydrocarbon zone is indicative of displaceable hydrocarbons in a formation traversed by a well bore. This low zone is comparatively narrow, for example, in one case 4 inches wide at 16 inches from the well bore and in other cases varying in width in proportion to the distance from the well bore, and may be found a distance from the face of the well bore equal to 1.5 to 20 times the diameter of the well bore, although in most cases this distance is between about 2 and 7 times the diameter of the well bore. In any event, in order to detect this low zone it is necessary to measure the resistivity at a point close to the well bore, at a point a considerable distance from the well bore and at an intermediate point in the formation of interest; and, accordingly, a logging tool having at least three pick-up elements, one comparatively close to the transmitting element, a second a considerable distance from the transmitting element and a third intermediate the first and second, must be employed. By way of illustration, for a normal-type device, in which a current electrode is located on the sonde and the potential difference between a potential electrode located at the surface of the earth and a potential electrode located on the sonde is measured and the electrode spacing is expressed as the distance between the current electrode and the potential electrode on the sonde, the potential electrode nearest the current electrode should have a spacing of less than about 6 inches and the potential electrode most remote from the current electrode should have a spacing of about 80 inches; for a lateral-type device, in which a current electrode is located on the sonde and the potential difference between two potential electrodes located on the sonde is measured and the electrode spacing is expressed as the distance between the current electrode and a point midway between the two potential electrodes on the sonde, the spacings should be approximately 12 inches and 160 inches; and for an induction-type device, in which a transmitting coil is located on the sonde and a receiving coil is located on the sonde and the coil spacing is expressed as the distance between the transmitting coil and the receiving coil on the sonde, as more fully explained in "Introduction to Induction Logging and Application to Logging of Wells Drilled with Oil Base Mud," By H. G. Doll, Transactions Aime, volume 186 (1949) page 148, the spacing should be about 12 inches and 160 inches. However, it should be recognized that shorter spacings may be employed as a practical matter. In addition, since the exact location of the low zone cannot be predicted, it is desirable to have as many pick-up elements as possible between these two extremes. As a specific example, a highly effective tool for this purpose comprises a lateral device having a transmitting element and about 18 pick-up elements distributed over a distance of about 72 inches.

In view of the close proximity of at least one of the pick-up elements to the transmitting element a serious problem exists due to the preferential flow of current through the drilling fluid in the well bore rather than through the formation surrounding the well bore and, as a result, the resistivities measured by the pick-up elements located close to the transmitting element are masked by the current flowing in the well bore. In prior art methods employing pick-up elements located close to a transmitting element the effect of the current flowing in the well bore has been corrected for by a series of "departure" curves. However, as pointed out in the co-pending applications referred to above these corrections were found inadequate and it was necessary to provide means for blocking the flow of current in the well bore. In accordance with these applications it was found that the flow of current in the well bore could be effectively blocked and accurate resistivity measurements could be obtained by providing a plurality of non-conductive elements substantially equal to the size of the well bore and perpendicular to the path of current flow in the well bore. Although these current-blocking elements were generally effective on relatively short logging sondes it was found that the current-blocking elements have a tendency to jam against the walls of the well bore and the current-blocking elements are thus damaged when a tool of considerable length is employed. In accordance with the present invention, one solution to this problem is to provide current-blocking elements for only a short distance from the transmitting element since the flow of current in the well bore is a serious problem only for a comparatively short distance from the transmitting element. For example, if the true resistivity of the formation is 10 ohm-meters, the resistivity of the drilling fluid is 1 ohm-meter and the well bore is 8 inches in diameter, the influence on resistivity measurements of the current flowing in the well bore will be small when a measurement is made by an electrode located 20 inches from the transmitting electrode. Thus in this case, current-blocking means should be needed for only 20 inches beyond the transmitting electrode. However, it has also been found, in accordance with the present invention, that false values of resistivity are obtained at pick-up elements beyond the current-blocking means even though the current-blocking means are provided for the full length of this critical distance. It has been found that these false indications can be eliminated by gradually diminishing the current-blocking effect from this point as the pick-up element most remote from the transmitting element is approached, and that a logging sonde which can be safely run is also provided.

Figure 3:
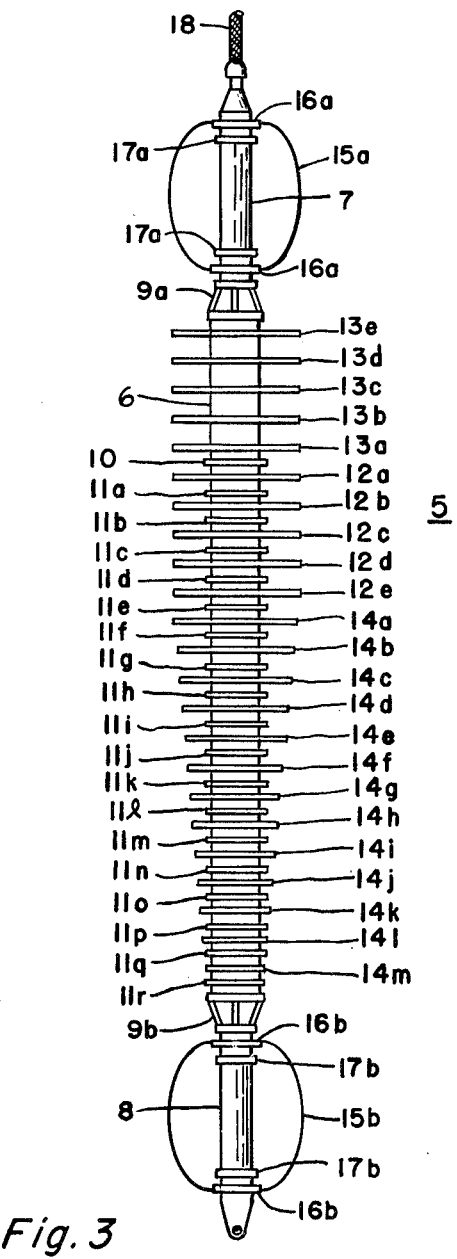
Figure 3 is a diagrammatic representation of one modification of the logging tool of the instant invention in detail.

Figure 3 shows one form of the novel logging sonde of the instant invention in detail. In this figure the numeral 5 refers generally to a logging sonde. Sonde 5 consists of a hollow intermediate section 6, made of a non-conductive material such as Bakelite or the like, an upper hollow section 7, and a lower section 8 which may be hollow or solid, as desired. Upper section 7 and lower section 8 may be made of any desirable material, although a non-corrosive material, such as stainless steel, is preferred. Connecting intermediate section 6 to upper section 7 and lower section 8 are suitable coupling elements 9a and 9b, respectively, which are provided with suitable openings which permit the passage of drilling fluid through section 6 during lowering or raising of the instrument.

A transmitting or current electrode 10, which is preferably a band of non-corrosive metal, such as stainless steel or lead, is secured to section 6 near the upper end thereof. A plurality of pick-up or potential electrodes 11a through 11r, also comprising bands of non-corrosive metal, are secured to section 6 at spaced intervals below current electrode 10. Although potential electrodes 11a through 11r are preferably equally spaced apart it is not absolutely necessary that such be the case. In the embodiment shown, 18 potential electrodes are depicted, potential electrode 11a being four inches from current electrode 10 and the potential electrodes 11a through 11r being spaced an equal distance from one another. Although the number and spacing of electrodes shown in Figure 3 have been found most practical and are therefore preferred, other numbers of potential electrodes and other spacings may be employed. However, in a sonde adapted to measure the low zone in a formation containing displaceable hydrocarbons there must be a minimum of 3 potential electrodes of like character (all lateral, all normal or all differential lateral), the first potential electrode should be less than 12 inches from the current electrode and the potential electrodes should be less than 9 inches apart.

In order to effectively eliminate the interfering effects of current flowing in the well bore a plurality of disc-shaped current-blocking elements 12a through 12e are secured to section 6. These current-blocking elements are of a diameter substantially equal in diameter to the diameter of the well bore, preferably equal in diameter to 0.9 times the diameter of the well bore. Current-blocking elements 12a through 12e are distributed along section 6 a distance such that the effect of current flowing in the well bore will be small beyond the lowermost current-blocking element 12e. This distance depends upon the diameter of the well bore and the ratio of the true formation resistivity to the resistivity of the drilling fluid, and therefore, cannot be expressed in absolute numbers which will apply to every case. However, the required distance may be estimated with sufficient accuracy by reference to appropriate departure curves, and, should be at least about 12 inches but substantially less than the total distance between the current electrode and the lowermost potential electrode. In the sonde illustrated in Figure 3, the distance between current electrode 10 and current-blocking element 12e is 20 inches.

Due to the tendency of electrical current to flow in the well bore rather than the earth formations surrounding the well bore, it is also highly desirable to provide a plurality of current-blocking elements 13a through 13e above current electrode 10. These current-blocking elements are also substantially equal in diameter to the diameter of the well bore and serve to prevent the current leaving electrode 10 from assuming distorted paths through the formations surrounding the well bore. In addition to the previously mentioned current-blocking elements (12a—12e and 13a—13e) a plurality of current-blocking elements 14a through 14m are secured to section 6 below current-blocking element 12e. Current-blocking elements 14a through 14m are of gradually diminishing diameter from 14a, which is only slightly smaller than the diameter of element 12e, to 14m, which is only slightly larger than the diameter of section 6. As previously pointed out, gradual diminution in the size of current-blocking elements 14a through 14m serves a two-fold purpose. It not only eliminates false indications of a low zone, which were sometimes measured by a sonde having full-size current-blocking elements distributed over the entire length of the sonde or result from an abrupt change from full-size current-blocking elements to no current-blocking elements at a point between the current electrode and the lowermost potential electrode, but provides a sonde which can be safely run without jamming and sticking.

Current-blocking elements 12a—12e, 13a—13e, and 14a—14m are made of a non-conductive material which is somewhat flexible, such as rubber, in order to further eliminate the possibility of jamming and sticking against the walls of the well bore. However, these current-blocking elements should also have sufficient rigidity to prevent too much flexing and a consequent change in the effective spacings between the electrodes.

It is also obvious that the functions performed by the current-blocking elements shown in Figure 3 can also be performed to a lesser degree by providing a plurality of closely spaced current-blocking elements in the critical section adjacent the current electrode and thereafter gradually increasing the distance between current-blocking elements as the lowermost potential electrode is approached or by a combination of current-blocking elements of gradually decreasing size and gradually increasing spacing.

Mounted on each end of sonde 5 are centralizers 15a and 15b. These centralizers each have a pair of collars 16a and 16b which are slidably mounted on section 7 and section 8, respectively. Attached to section 7 and section 8 between the slidable collars are rigid collars 17a and 17b, which limit the sliding movement of collars 16a and 16b. These centralizers serve to center the sonde in the well bore and thus permit the current-blocking elements to function efficiently and also aid in the prevention of jamming and sticking of the sonde in the well bore.

Located within section 7 of sonde 5 are switching means or means for telemetering the potentials picked up by potential electrodes 11a—11r to the surface of the earth through cable 18.

Figure 4 illustrates a typical recording system which may be employed to record the signals picked up by the potential electrodes of the sonde of Figure 3. In Figure 4, sonde 5 is shown suspended by means of cable 18 in a well bore 19 containing an electrically conductive fluid 20. The signals are transmitted to the surface of the earth through cable 18. Cable 18 is wound on reel 21 which is adapted to be rotated by a power source, not shown, to lower and raise sonde 5 in the well bore. Reel 21 is provided with a plurality of slip rings 22a, 22b, 23a and 23b to which the recording mechanism and a source of power is connected. The source of power 24 is connected through conductors 25a and 25b and conductors 26a and 26b to slip rings 22a and 22b to provide a source of power for the current electrode of sonde 5 and switching means or telemetering means located in sonde 5. Source of power 24 also provides power for potentiometer 27 which is electrically connected to conductors (not shown) in cable 18 by means of conductors 28a and 28b and slip rings 23a and 23b, thus providing means for conducting the signals which are sent from sonde 5 to potentiometer 27. Potentiometer 27 is connected through conductors 29a and 29b to rectifier 30 and after the signals are rectified they are passed through conductors 31a and 31b to recorder 32. It will be appreciated therefore that the signals which are sent from sonde 5 are transmitted to slip rings 23a and 23b, through conductors 28a and 28b to potentiometer 27, thence to rectifier 30 through conductors 29a and 29b, and finally to recorder 32 through conductors 31a and 31b. Any other well known arrangement of potentiometers, rectifiers, or recorders can be used without departing from the scope of this invention and it is to be understood that the description appearing above is merely illustrative.

Figure 5 illustrates a second embodiment of the instant invention as applied to a logging sonde of the induction logging type. This logging sonde is referred to generally by the numeral 33. Sonde 33 includes an intermediate section 34, an upper section 35 and a lower section 36. A transmitting coil 37 through which an alternating current of appropriate frequency is caused to flow is mounted on intermediate section 34 near the top thereof. The alternating magnetic field thus created by the current generates eddy currents which currents follow circular paths, co-axial with the well bore, in the formations surrounding the well bore. These eddy currents create a secondary magnetic field which induces an electromotive force in pick-up or receiving coils 38a through 38r, also mounted on intermediate section 34. The energy received in each of receiving coils 38a through 38r is transmitted to the surface of the earth through cable 39. Inasmuch as conductivity is the reciprocal of resistivity, this system is, therefore, also capable of measuring resistivities in a manner similar to the system of Figure 3.

The induction logging system of Figure 5 is also inherently subject to the same difficulties previously discussed in connection with the system of Figure 3, and therefore suitable means for blocking the flow of current in the well bore have also been found necessary. Inasmuch as the flow of current in an induction type logging system is co-axial with the well bore current-blocking elements 40 are in this instance a plurality of non-conductive, vertically-disposed fins attached to intermediate section 34 of sonde 33. Current-blocking elements 40 are made of a suitable non-conductive, flexible material such as rubber. These current-blocking elements are also substantially equal to the diameter of the well bore for a distance from transmitting coil 37 such that the effect of current flowing in the well bore will be small beyond such point and are then gradually tapered to substantially the diameter of intermediate section 34 of sonde 33 as receiving coil 38r is approached.

Upper section 35 of sonde 33 contains appropriate switching means or telemetering means for transferring signals picked-up by receiving coils 38a through 38r to the surface of the earth through cable 39.

Upper section 35 and lower section 36 of sonde 33 have mounted thereon centralizers 41a and 41b, respectively. These centralizers are similar to centralizers 15a and 15b of Figure 3 and also have cooperating stationary collars 42a and 42b which limit the movements of the centralizers.

Figures 7, 8:
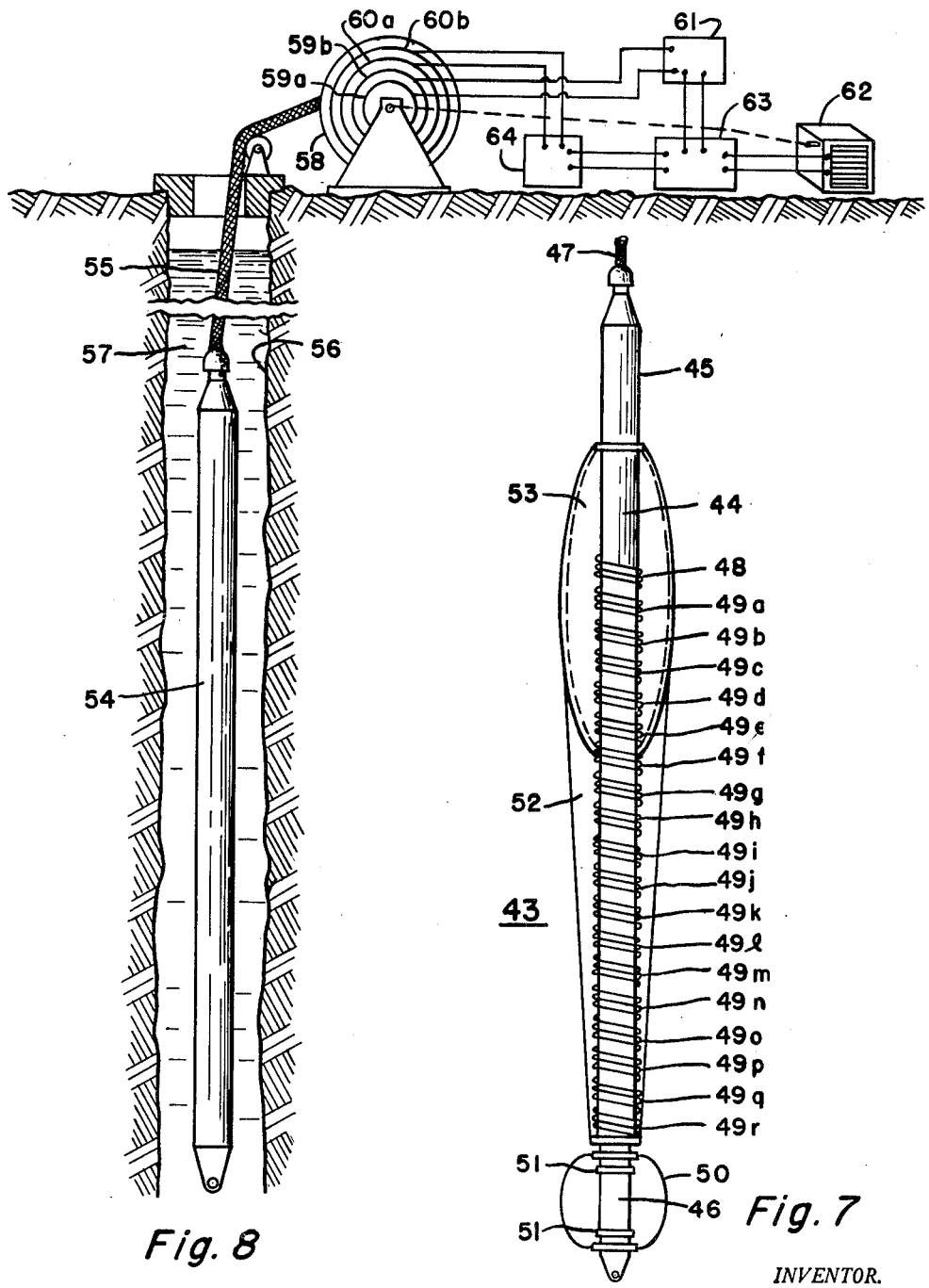
Figure 7 is a diagrammatic representation of a third modification of the logging tool of the instant invention in detail.
Figure 8 is a diagrammatic representation of a typical recording system for the tool of Figures 5 and 7.

Still another embodiment of the instant invention is shown in Figure 7 wherein an induction type logging sonde almost identical to that shown in Figure 5 is illustrated. The particular sonde of Figure 7 is indicated generally by the numeral 43. This sonde includes an intermediate section 44, an upper section 45 containing appropriate switching means or telemetering means, a lower section 46, cable 47, transmitting coil 48, receiving coils 49a through 49r, and centralizer 50 together with cooperating collars 51, all of which correspond to similar elements in the apparatus of Figure 5. However, sonde 43 of Figure 7 differs from sonde 33 of Figure 5 in the construction of current-blocking elements 52. Current-blocking elements 52 correspond in general shape and disposition on intermediate section 44 to the current-blocking elements of Figure 5 but are somewhat more flexible, at least at their upper ends, in order to permit limited vertical and longitudinal extension in cooperation with centralizer 53, the ribs of which are mounted in current-blocking elements 52 and which is slidably mounted on intermediate section 44 of sonde 43. Centralizer 53 is a non-conductive element of the leaf spring-type and functions in essentially the same manner as centralizer 41a of Figure 5.

Figure 8 illustrates recording apparatus suitable for use in connection with induction logging sondes 33 and 34 of Figures 5 and 7 respectively. In Figure 8, an induction logging sonde is designated by the numeral 54. Sonde 54 is suspended from cable 55 in well bore 56 containing fluid 57. Cable 55 is wound on reel 58 which is adapted to be rotated by a power source, not shown, to lower and raise sonde 54 in well bore 56. Reel 58 is provided with slip rings 59a, 59b, 60a, and 60b. Slip rings 59a and 59b are connected to the receiving coils of sonde 54 by means of conductors, not shown, in cable 55. Slip rings 59a and 59b are connected to amplifier 61 and thence to recorder 62. A phase sensitive detector 63, which is controlled by transmitting oscillator 64, is connected between amplifier 61 and recorder 62 so that only that part of the received signal that is in phase with the current in the transmitting coil of sonde 54 is recorded. Oscillator 64 sends an alternating current signal to the transmitting coil of sonde 54 by means of slip rings 60a and 60b and conductors, not shown, in cable 55.

Although, the apparatus of the present invention is particularly adapted for use in connection with a method for detecting displaceable hydrocarbons and has been specifically described by reference to this method, it is to be understood that the specific examples disclosed herein are merely illustrative and that this apparatus may be employed to carry out various other methods in which a substantial number of measurements of resistivity or functional equivalents thereof are to be made at points both close to the well bore and at a substantial distance from the well bore and it is necessary to eliminate the effect which currents flowing in the well bore have on such measurements. It is also to be understood that, while the above describes and shows the preferred embodiments of the instant invention, these embodiments are illustrative and that various changes in size, shape, materials, and arrangement of parts and substitutions of equivalent elements may be made without departing from the scope of the present invention, and that the present invention broadly relates to logging sondes having a plurality of transmitting and receiving elements in combination with means for blocking the flow of current in the well bore, which means exert full current-blocking effect for a predetermined distance from the transmitting element and a gradually diminishing current-blocking effect beyond this predetermined point as the distance from the transmitting element increases. Specifically, the use of a plurality of current electrodes and one potential electrode as permissible by the reciprocity theorem would fall within the scope of this invention. It should also be understood that this invention is applicable to the measurement of resistivities by the use of either induction methods or electrode methods, such as normals, laterals, or differential laterals, and that well instruments made according to this invention can be employed in any of these methods.

I claim:

1. Apparatus for logging earth formations surrounding a well bore containing a conductive fluid comprising an elongated support member adapted to be passed through said well bore, transmitting means on said support member, a source of electric energy connected to energize said transmitting means, a plurality of receiving means on said support member displaced from one another and from said transmitting means longitudinally of said support member, electrical indicating means connected to said receiving means, and electric energy-blocking means on said support member in the vicinity of said transmitting means for impeding the flow of electric energy which would normally follow paths through said fluid only during operation of the logging apparatus, said energy-blocking means being further characterized by having a maximum energy-impeding effect for a predetermined longitudinal distance from said transmitting means and an energy-impeding effect which diminishes from said maximum as the longitudinal distance from said transmitting means increases in the direction of the receiving means most remote from said transmitting means.

2. Apparatus in accordance with claim 1 which includes at least 3 receiving means.

3. Apparatus in accordance with claim 1, wherein the electric energy-blocking means exerts a maximum energy-impeding effect for substantially equal longitudinal distances on both sides of the transmitting means and the energy-impeding effect diminishes from said maximum as the longitudinal distance from said transmitting means increases in the direction of the receiving means most remote from said transmitting means.

4. Apparatus in accordance with claim 1, wherein the predetermined distance from the transmitting means over which the electric energy-blocking means has a maximum energy-impeding effect is at least 12 inches but is substantially less than the distance from said transmitting means to the receiving means most remote from said transmitting means.

5. Apparatus in accordance with claim 1, wherein at least one centralizing means is mounted on the support member for resiliently contacting the walls of the well bore and centralizing the support member therein.

6. Apparatus for logging earth formations surrounding a well bore containing a conductive fluid comprising an elongated support member adapted to be passed through said well bore, a current electrode on said support member, a source of electric energy connected to energize said current electrode, a plurality of potential electrodes on said support member displaced from one another and from said current electrode longitudinally of said support member, electrical indicating means connected to said potential electrodes, and a plurality of disk-shaped, nonconductive current-blocking elements distributed along said support member and extending radially toward the walls of said well bore, said current-blocking elements being substantially equal in diameter to the diameter of said well bore for a predetermined distance from said current electrode and thereafter decreasing in diameter as the longitudinal distance from said current electrode increases in the direction of the potential electrode most remote from said current electrode.

7. Apparatus in accordance with claim 6, wherein a first of the potential electrodes is spaced less than 12 inches from the current electrode and each of the other potential electrodes is spaced less than 9 inches from the next preceding potential electrode.

8. Apparatus in accordance with claim 6, wherein at least one current-blocking element is mounted between each of the current and potential electrodes.

9. Apparatus for logging earth formations surrounding a well bore containing conductive fluid comprising an elongated support member adapted to be passed through said well bore, a transmitting coil on said support member, a source of electric energy connected to energize said transmitting coil, a plurality of receiving coils on said support member displaced from one another and from said transmitting coil longitudinally of said support member, electrical indicating means connected to said receiving coils, and at least one elongated, nonconductive fin mounted longitudinally on said support member and extending laterally toward the walls of said well bore, said fin being further characterized by having a maximum lateral extension for a predetermined longitudinal distance from said transmitting coil and thereafter diminishing in lateral extension from said maximum as the longitudinal distance from said transmitting coil increases in the direction of the receiving coil most remote from said transmitting coil.

10. Apparatus in accordance with claim 9, wherein at least two fins are included and resilient centralizing means are incorporated in the lateral extremities of said fins for resiliently contacting the walls of the well bore and centralizing the support member therein.

References Cited in the file of this patent

UNITED STATES PATENTS

| | | |
|---|---|---|
| 2,210,205 | Elliott | Aug. 6, 1940 |
| 2,415,364 | Mounce | Feb. 4, 1947 |
| 2,564,861 | Sherborne | Aug. 21, 1951 |
| 2,723,375 | Schuster | Nov. 8, 1955 |
| 2,754,475 | Norelius | July 10, 1956 |
| 2,761,103 | Doll | Aug. 28, 1956 |

UNITED STATES PATENT OFFICE

CERTIFICATE OF CORRECTION

Patent No. 2,842,735                                                   July 8, 1958

John L. Martin

It is hereby certified that error appears in the printed specification of the above numbered patent requiring correction and that the said Letters Patent should read as corrected below.

Column 1, line 23, for "or-gas-bearing" read -- or gas-bearing --; line 27, after "known" insert a comma; column 2, line 22, for "radically" read -- radially --; column 4, line 21, for "existance" read -- existence --; line 33, for "2 and 7" read -- 2 to 7 --; lines 67 and 68, for "Transactions Aime" read -- TRANSACTIONS AIME --.

Signed and sealed this 14th day of October 1958.

(SEAL)
Attest:

KARL H. AXLINE
Attesting Officer

ROBERT C. WATSON
Commissioner of Patents